United States Patent
Erikson

Patent Number: 5,939,103
Date of Patent: Aug. 17, 1999

[54] GAS NOZZLE ASSEMBLY FOR A GAS ASSISTED INJECTION MOLDING SYSTEM

[76] Inventor: Jon R. Erikson, 1056 Hidden La., Rochester Hills, Mich. 48309

[21] Appl. No.: 08/822,725

[22] Filed: Mar. 24, 1997

Related U.S. Application Data

[63] Continuation-in-part of application No. 08/589,494, Jan. 22, 1996, Pat. No. 5,820,889.

[51] Int. Cl.⁶ .................................................. B29C 45/16
[52] U.S. Cl. .......................................... 425/130; 264/572
[58] Field of Search .................................... 425/130, 573, 425/546, 564, 566, 146; 264/572, 328.12, 328.8, 328.9

[56] References Cited

U.S. PATENT DOCUMENTS

| | | |
|---|---|---|
| 2,331,688 | 10/1943 | Hobson . |
| 3,021,559 | 2/1962 | Strong . |
| 3,135,640 | 6/1964 | Kepka . |
| 4,033,710 | 7/1977 | Hanning . |
| 4,106,887 | 8/1978 | Yasuike et al. . |
| 4,474,717 | 10/1984 | Hendry . |
| 4,555,225 | 11/1985 | Hendry . |
| 4,781,554 | 11/1988 | Hendry ................................. 4256/4 R |
| 4,932,854 | 6/1990 | Matsuda et al. . |
| 4,935,191 | 6/1990 | Baxi . |
| 4,943,407 | 7/1990 | Hendry . |
| 5,044,924 | 9/1991 | Lorén . |
| 5,047,183 | 9/1991 | Eckardt et al. . |
| 5,069,859 | 12/1991 | Loren . |
| 5,080,057 | 1/1992 | Baxi et al. .............................. 425/130 |
| 5,098,637 | 3/1992 | Hendry . |
| 5,110,533 | 5/1992 | Hendry . |
| 5,118,455 | 6/1992 | Loren . |
| 5,133,914 | 7/1992 | Kubota et al. . |
| 5,137,680 | 8/1992 | Hendry . |
| 5,149,547 | 9/1992 | Gill . |
| 5,151,242 | 9/1992 | Soeda et al. . |
| 5,151,278 | 9/1992 | Baxi et al. . |
| 5,164,200 | 11/1992 | Johnson ................................... 415/130 |
| 5,198,177 | 3/1993 | Sugiyama et al. . |
| 5,198,238 | 5/1993 | Baxi . |
| 5,200,127 | 8/1993 | Nelson . |
| 5,232,654 | 8/1993 | Aida et al. ............................... 264/572 |
| 5,232,711 | 8/1993 | Hendry . |
| 5,284,429 | 2/1994 | Schneider et al. . |
| 5,307,347 | 4/1994 | Shah ........................................ 264/572 |
| 5,482,669 | 1/1996 | Shah ........................................ 264/572 |
| 5,511,967 | 4/1996 | Berdan .................................... 425/533 |
| 5,518,386 | 5/1996 | Hendry .................................... 425/130 |

FOREIGN PATENT DOCUMENTS

| | | |
|---|---|---|
| 2106546 | 8/1972 | Germany . |
| 1076047 | 8/1967 | United Kingdom . |
| 2158002 | 6/1987 | United Kingdom . |

OTHER PUBLICATIONS

"Structural Foam: Where It's Headed", Michael Colangelo, *Plastics Technology*, Jun. 1983, pp. 741–745.

*Primary Examiner*—Tim Heitbrink
*Attorney, Agent, or Firm*—Bliss McGlynn, P.C.

[57] ABSTRACT

A gas nozzle for a gas assisted injection molding system includes a body having an inlet in fluid communication with a source of pressurized gas, an outlet through which the gas leaves the nozzle and a passage extending between the inlet and the outlet. The outlet includes a plurality of apertures arranged in a predetermined manner relative to one another such that the flow path through the outlet approximates a ⅛ inch hole but does not clog with resin over successive plastic injections into the mold.

17 Claims, 6 Drawing Sheets

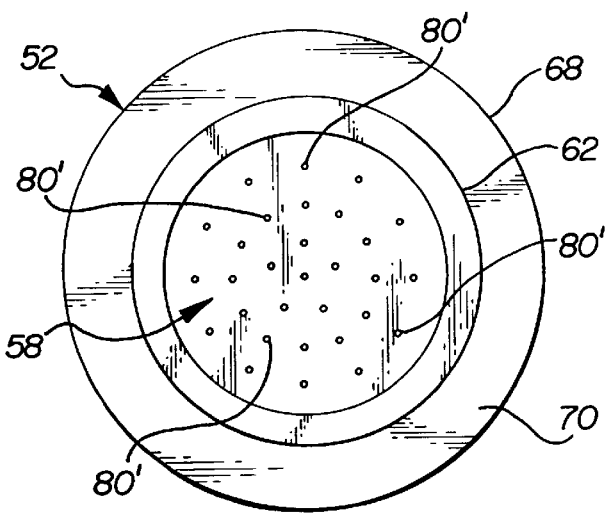
FIG-8
FIG-9
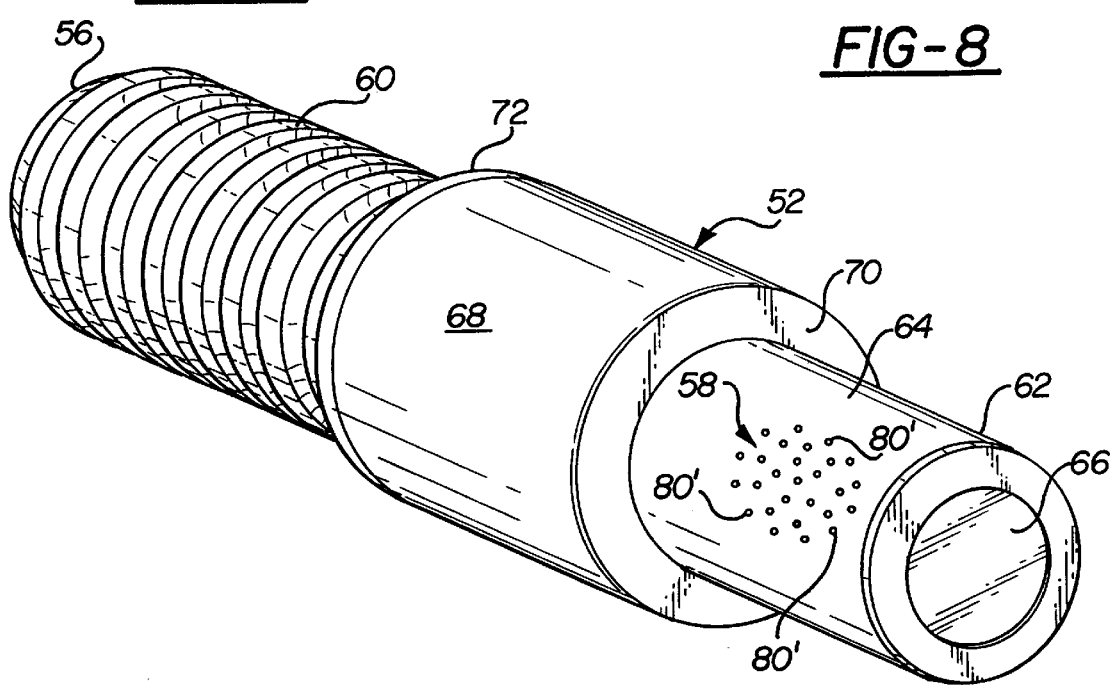
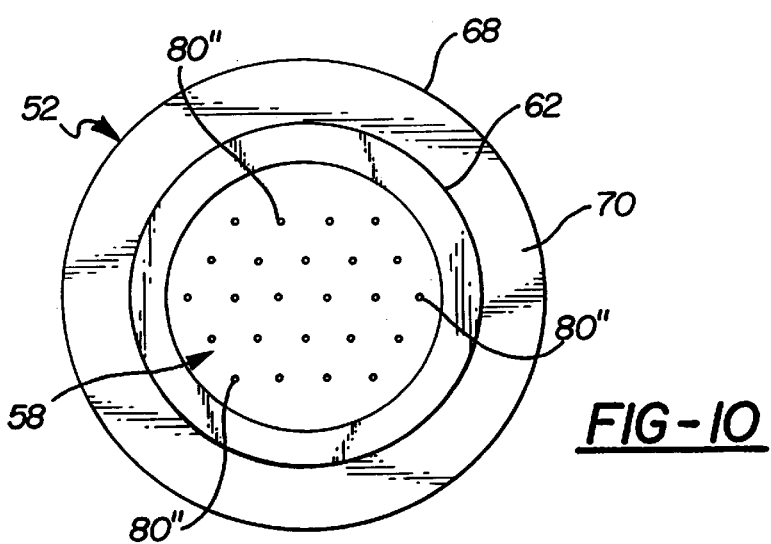
FIG-10

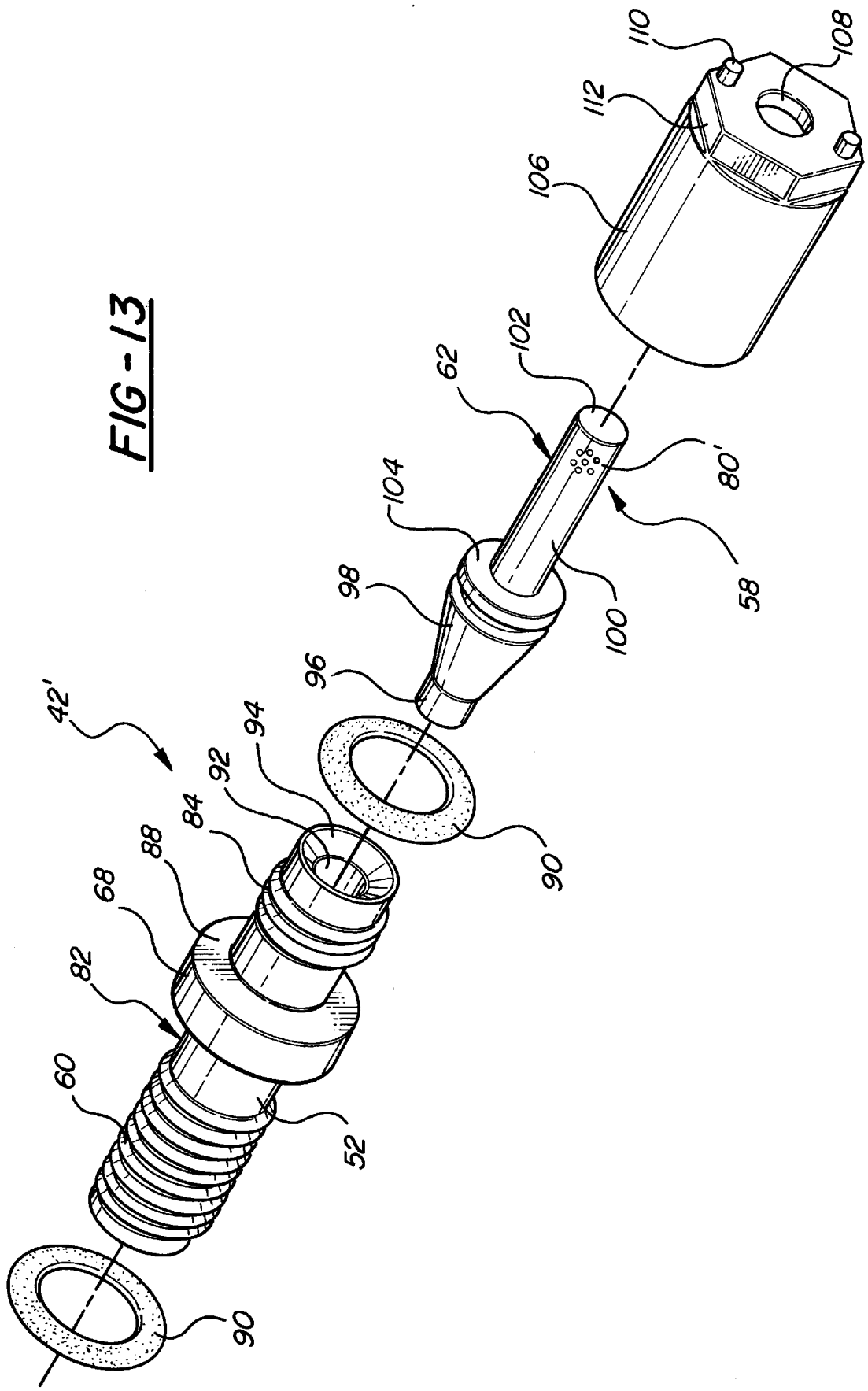

GAS NOZZLE ASSEMBLY FOR A GAS ASSISTED INJECTION MOLDING SYSTEM

RELATED UNITED STATES PATENT APPLICATION

This application is a Continuation-in-Part of co-pending U.S. patent application Ser. No. 08/589,494 filed in Jan. 22, 1996 entitled "A GAS NOZZLE FOR A GAS ASSISTED INJECTION MOLDING SYSTEM" now U.S. Pat. No. 5,820,889.

BACKGROUND OF THE INVENTION

1. Technical Field

The present invention relates, generally, to a gas assisted injection molding system. More specifically, the invention relates to a gas nozzle employed in such systems.

2. Description of the Related Art

Gas assisted plastic injection molding is a well established and commercially accepted method for providing plastic articles having a hollow interior. These hollow, plastic articles have numerous advantages, such as high strength, low weight, reduced plastic material cost and improved article appearance due to less shrinkage stress. A detailed discussion of the development of gas assisted injection molding technology is contained in U.S. Pat. No. 5,110,533 and incorporated herein by reference.

In gas assisted injection molding, the articles are produced by injecting molten resin into the mold cavity and injecting a quantity of pressurized gas into the resin to fill out the mold cavity and form a hollow portion in the resin. The gas is preferably an inert gas such as nitrogen. The gas pressure is maintained in the mold cavity and against the resin until the plastic has cooled sufficiently to be self supporting. Thereafter, the gas is vented, the mold is opened and the plastic article is removed from the cavity. One example of a gas assisted molding apparatus is disclosed in U.S. Pat. No. 5,639,405 issued Jun. 17, 1997 and incorporated herein by reference.

Generally speaking, there are two points of entry for gas in an injection molding environment: (1) at the injection molding machine nozzle; and (2) in the mold.

When the gas is injected through the same nozzle employed for injecting the plastic into the mold, the gas pressure must be relatively high because the gas bubble will not penetrate the plastic until the gas pressure is greater than the plastic injection pressure. In addition, any restriction such as at the gate will impede the bubble penetration requiring higher initial gas pressures to move the plastic to fill out the mold. However, when the pressure is too high, and once the bubble breaks through the gate, the gas will rocket through the cavity which is at a lower pressure to the end of the plastic flow front. If this occurs, the gas may escape the envelope of the plastic material unless there is extra resin in the cavity to resist this high pressure. Such elevated initial gas pressures at the plastic injection nozzle may wash away most of the plastic that is adjacent the gate including the material at the nominal wall. Gas injection at the plastic nozzle also requires complicated resin shut-off devices, valves and sealing members which ultimately wear out and are generally expensive.

On the other hand, gas may be injected directly into the mold at either the mold cavity (in-article) or at some point along the runner (in-runner). Where gas is injected directly into the mold cavity, the initial gas pressure at the beginning of the gas filling phase of the process can be much lower than that employed at the resin injection nozzle. The lower gas pressure will tend to complete the polymer fill at a velocity that is closer to the initial polymer fill velocity, thereby avoiding a gloss variation between initial polymer fill and gas pressure fill. Gas nozzles located in the runner are advantageous where the design of the part or structure of the mold does not lend itself to the in-article approach.

Numerous gas nozzles have been proposed in the related art to take advantage of the design and engineering advantage of mold cavity and runner gas injection. For example, stationary gas nozzles have been employed in the related art because such nozzles generally involve a reduction or elimination of any moving parts. Such stationary nozzles are simple and cost effective. However, stationary nozzles suffer from the disadvantage that they often become clogged with resin during the injection process and must be cleaned on a regular basis.

In order to overcome this problem, gas nozzle designers have incorporated resin check valves to block the flow of molten resin into the gas nozzle. Unfortunately, these resin check valves increase the cost and complexity of such nozzles.

Another solution proposed in the related art involves a hollow gas nozzle with an interior solid pin that has been relieved on a portion of one side to allow for a gas passage through the nozzle. Unfortunately, problems still exist with such nozzles of the related art. More specifically, these gas nozzles are typically mounted from the back side of the mold which is fixedly mounted to the platen of an injection molding press. If the mold is overshot during the injection process, as can frequently be the case, excessive injection pressure can clog the nozzle with resin. In this case, the mold must be removed from the platen and the gas nozzle disassembled and cleaned. Further, gas may exit such nozzles only through the top or terminal end thereof which is a limiting factor in the design of the part and the mold. Finally, larger parts often require a larger volume of gas flow and the relieved area of the gas nozzle does not accommodate this larger volume.

Additionally, the nozzles of the related art discussed above suffer from the disadvantage that once they are connected to a source of pressurized gas, such as when mounted in the mold or runner, they are not easily adjusted thereafter. This disadvantage is particularly apparent when the direction of the flow of gas from the nozzle is important. This often occurs when it is desirable to direct the flow of gas in a particular way into the mold and the gas nozzle includes an outlet which extends generally perpendicular to the main flow passage of the nozzle or out the side of the nozzle tip.

Thus, there is a need in the art for a simple, cost effective, efficient, stationary gas nozzle which includes no moving parts and which will not clog with resin during polymer fill or gas venting even after repeated shots of the mold. Further, there is a need in the art for such a nozzle wherein the direction of the flow of gas may be easily adjusted and wherein the tip of the nozzle may be quickly and easily changed without complicated maintenance or extended shut down time.

SUMMARY OF THE INVENTION

The present invention overcomes the disadvantages in the related art in a gas nozzle assembly for a gas assisted injection molding system. More specifically, the gas nozzle of the present invention includes a fitting having an inlet providing fluid communication with a source of pressurized gas. The assembly further includes a gas pin portion having an outlet through which gas leaves the nozzle assembly. A passage extends between the inlet and the outlet through the gas pin portion and the fitting. The outlet includes a plurality of apertures arranged in a predetermined manner relative to one another. The gas pin portion is adjustably and removably mounted to the fitting such that the orientation of the outlet relative to the mold may be changed.

The plurality of apertures, while individually very small, provide a flow passage for the gas which approximates the flow path (but not volume) of gas through a hole having a diameter of between 0.055 to 0.125 inches. And while the molten resin may form a "skin" over the outlet at the completion of a molding cycle, the individual apertures are sufficiently small such that they do not become clogged. Further, the "skin" covering the plurality of apertures is easily blown off during the next injection of gas for a subsequent part. The gas pin is adjustable such that the direction of the flow of gas from the outlet may be quickly and easily oriented. Further, the gas nozzle assembly of the present invention facilitates interchangeable gas pins providing another dimension of flexibility for the mold designer.

One advantage of the present invention is that a stationary gas pin for a gas assisted injection molding system is provided which includes no moving parts and does not require any expensive seals. Another advantage of the present invention is that the outlet for the gas does not become clogged with resin during successive molding processes. Still another advantage of the present invention is that the outlet for the gas is formed by a plurality of very small apertures arranged in a predetermined manner such that they approximate the flow path of a hole having a diameter of between 0.055 to 0.125 inches. Still another advantage of the present invention is that the gas nozzle may be mounted in the cavity of the mold such that it is very accessible to the operator and may be quickly and easily adjusted, removed, changed or cleaned without complicated maintenance or extended shut down time.

Other features and advantages of the present invention will be readily appreciated as the same becomes better understood after reading the subsequent description when considered in connection with the accompanying drawings.

BRIEF DESCRIPTION OF THE DRAWINGS

FIG. 8 is an end view of the terminal end of the pin portion of the gas nozzle illustrating another alternate arrangement of the apertures of the outlet of the gas nozzle;

FIG. 9 is a perspective view of another embodiment of the gas nozzle of the present invention;

FIG. 10 is an end view of the terminal end of the pin portion of the gas nozzle illustrating one arrangement of the plurality of apertures of the outlet;

FIG. 13 is an exploded view of the gas nozzle assembly of the present invention.

DESCRIPTION OF THE PREFERRED EMBODIMENT(S)

Figure 1:
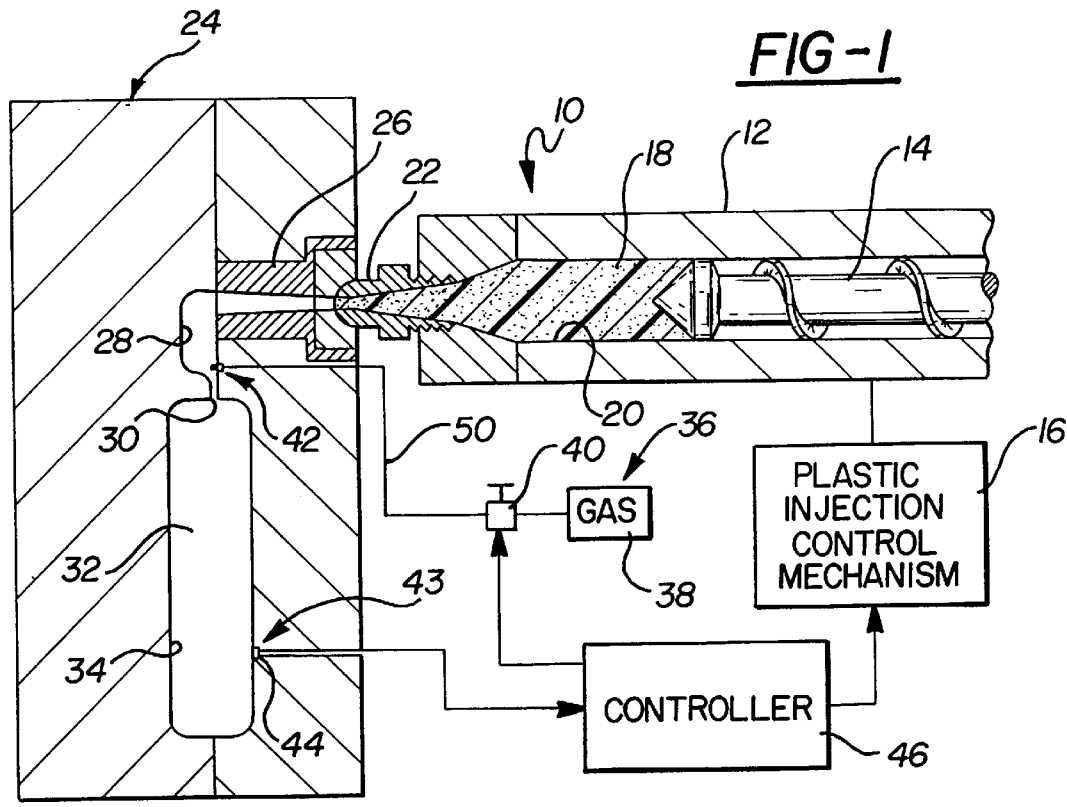
FIG. 1 is a schematic view of a plastic injection molding apparatus of the present invention wherein the plastic resin is shown just prior to injection into the mold and where the gas nozzle is located in the runner of the mold 24.
Figure 2:
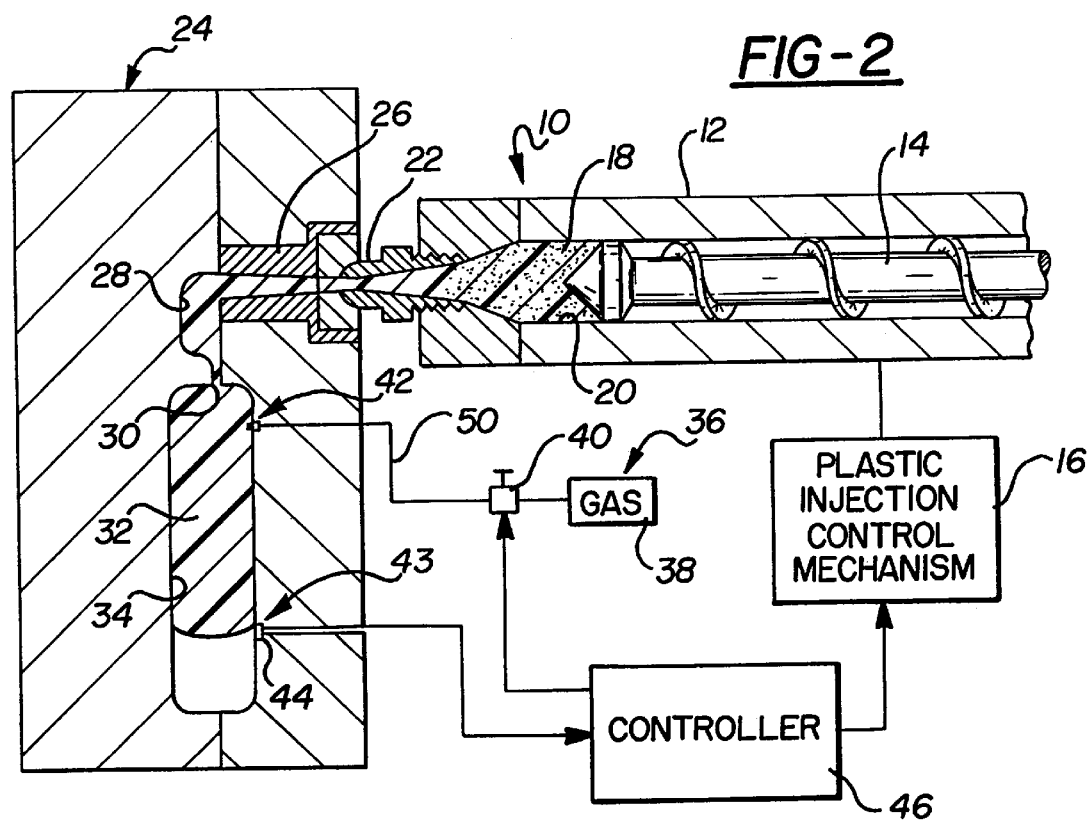
FIG. 2 is a schematic view of a plastic injection molding apparatus of the present invention wherein the plastic resin has partially filled the mold and the plastic injection is about to cease and where the gas nozzle is located in the mold cavity.
Figure 3:
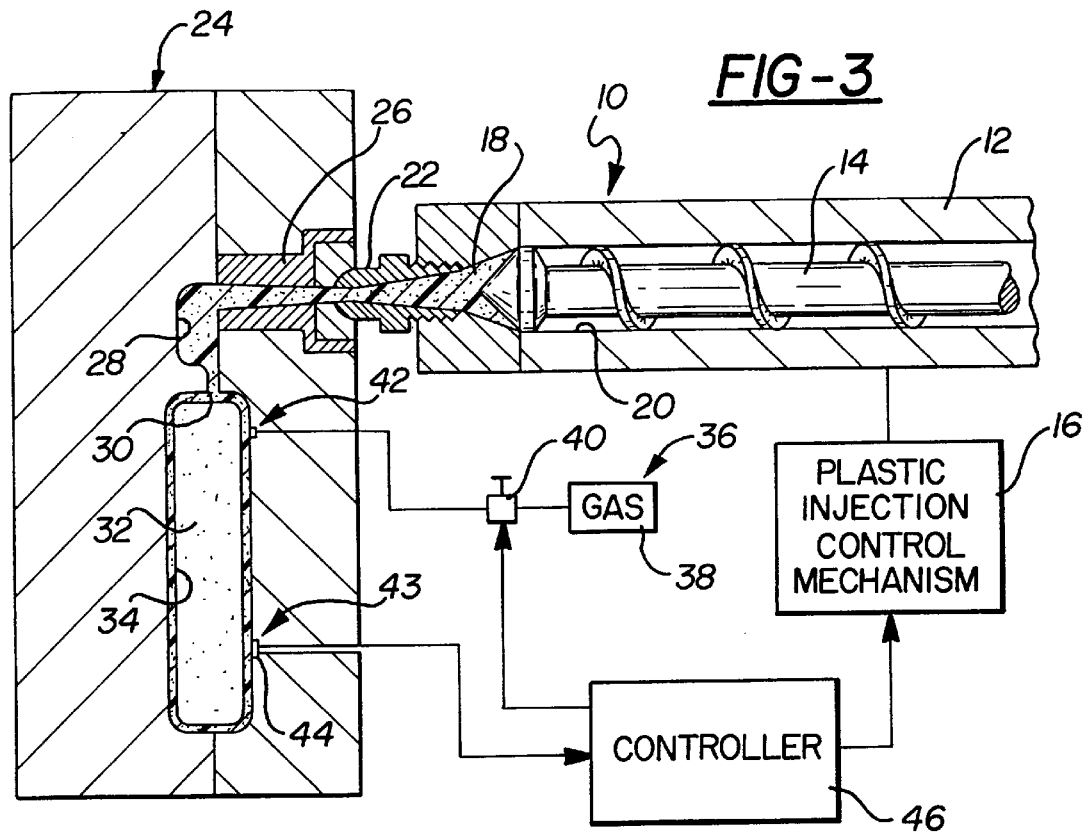
FIG. 3 is a schematic view of a plastic injection molding apparatus of the present invention wherein a plastic article in the cavity has been fully formed in response to plastic injection and the introduction of pressurized gas.

Referring now to the drawings, a gas assisted plastic injection molding apparatus is generally shown at 10 in FIGS. 1 through 3. The gas assisted plastic injection molding apparatus includes a plastic injector 12 which may have a screw-type ram 14 which is operatively controlled by a plastic injection control mechanisms 16. The plastic injection control mechanism 16 may comprise, for example, an electrical motor or hydraulic pump which drives the screw ram 14 and/or a gate valve to move molten resin 18 from a passage 20 in the injector 12 through an injector nozzle 22. Alternatively, the screw ram 14 may be replaced by any suitable means for forcing a shot of resin 18 from the injector 12 and into a mold, generally indicated at 24.

A sprue 26 is located between the injector nozzle 22 and a runner 28 in the mold 24. Similarly, a mold gate 30 is located between the runner 28 and the cavity 32 of the mold 24. The cavity 32 is defined by a cavity surface 34 which, in turn, defines the shape of the plastic article which is formed thereby.

A pressurized gas mechanism is generally indicated at 36 and includes a source of pressurized gas 38 and a pressure regulator 40. A gas nozzle, generally indicated at 42 in FIGS. 1 through 3, is employed to inject pressurized gas into the mold 24. More specifically, the gas nozzle 42 may be located in the runner 28 of the mold as shown in FIG. 1. Note here that the plastic resin 18 is shown just prior to injection into the mold. Alternatively, the gas nozzle 42 may also be located in the mold cavity 32 as shown in FIG. 2. As illustrated in this Figure, the plastic resin 18 has partially filled the mold cavity 32 and the plastic injection is about to cease. Further, and as shown in FIG. 3, a plastic article as defined by the cavity 32 of the mold 24 has been fully formed in response to the plastic injection and the introduction of pressurized gas through the gas nozzle 42 located in the cavity 32.

The plastic injection molding apparatus 10 further includes a flow front sensor control system, generally indicated at 43. This sensor control system 43 includes sensors 44 located at one or more predetermined locations at the cavity surface 34. A programmable data processing unit, or controller, 46 is employed to receive and store data from one or more of the sensors 44. The controller 46 also processes the data and thereupon selectively sends signals to the gas assisted plastic injection control mechanism 16 as well as the pressurized gas mechanism 36. These signals include a "stop injection" signal and a "start gas" signal. In this way, the gas assisted plastic injection molding apparatus 10 causes the plastic injection to start and stop and also causes the introduction of pressurized gas into the cavity to start and stop in response to those signals. The operation of the flow front sensor control system 43 is fully described in my previously identified U.S. Pat. No. 5,639,405.

Figure 4:
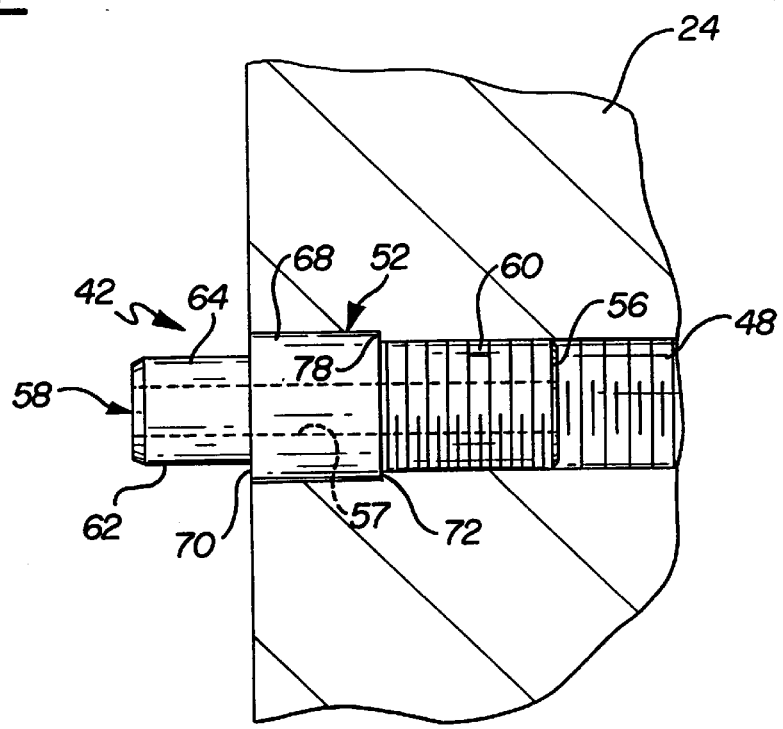
FIG. 4 is a cross-sectional side view of the gas nozzle of the present invention threadably mounted to the mold.

Referring now to FIG. 4, the gas nozzle 42 is shown mounted to the mold 24. Depending on the preference of the designer, part geometry and other considerations, the nozzle 42 may be mounted so as to inject gas into the runner 28 as illustrated in FIG. 1 or into the mold cavity 32 as illustrated in FIGS. 2 and 3. In either case, the mold 24 will include a threaded port 48 which is drilled through the mold and tapped. The threaded port 48 is in fluid communication with the source of pressurized gas 38 through a conduit 50 or any other suitable means.

Figure 5:
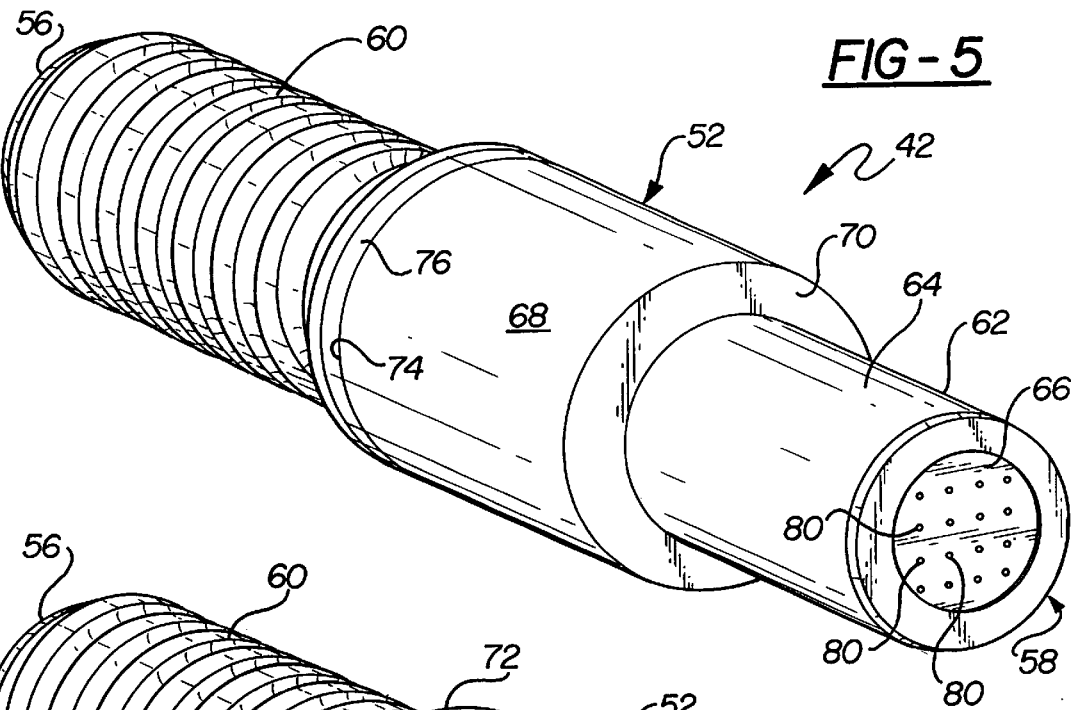
FIG. 5 is a perspective view of one embodiment of the gas nozzle of the present invention.
Figure 6:
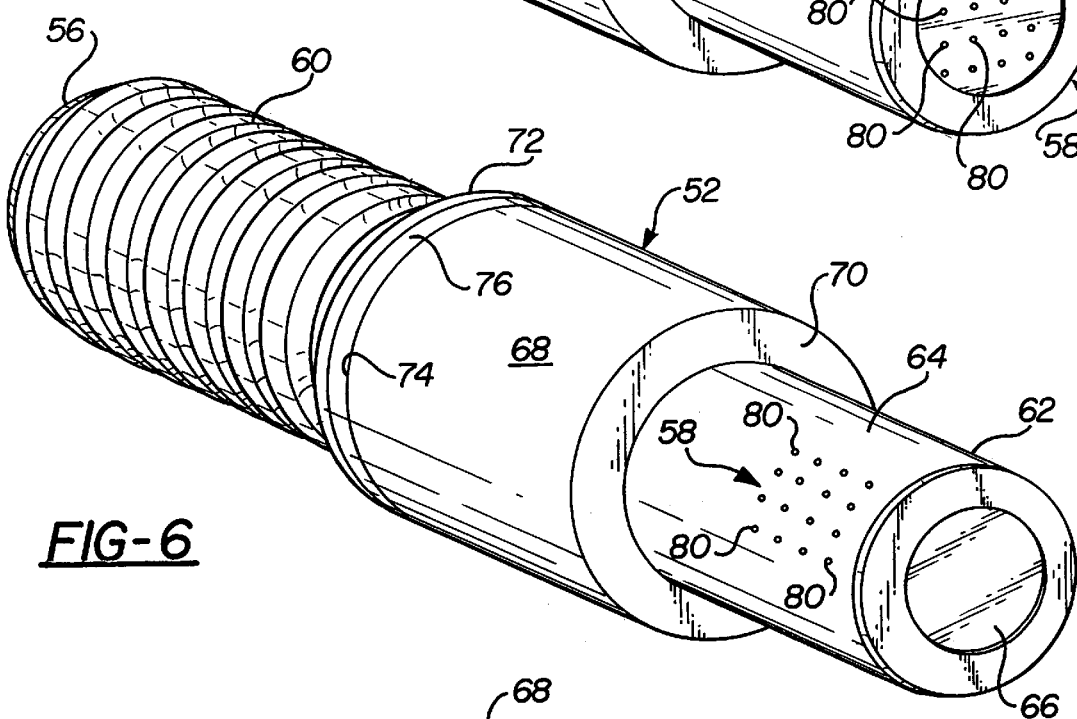
FIG. 6 is a perspective view of another embodiment of the gas nozzle of the present invention.

As best shown in FIGS. 4 through 6, the gas nozzle 42 is a unitary steel member including a body 52 having an inlet 56 in fluid communication with the source of pressurized gas 38. The gas nozzle 42 also includes an outlet, generally indicated at 58, through which the gas leaves the nozzle 42. In addition, the nozzle 42 includes a passage 57 which extends between the inlet 56 and the outlet 58. More specifically, the body 52 includes a threaded portion 60 which is threadably received in the port 48 such that the gas nozzle 42 is mounted in fluid communication with the source of pressurized gas 38 from the runner 28 or cavity 32 side of the mold 24. In this way, the nozzle 42 may be quickly replaced or serviced without having to remove the mold 24 from the platen (not shown). The body 52 also includes a pin portion 62 which defines an outer surface 64 and a terminal end 66. As illustrated in the figures, the terminal end 66 may be recessed into the bore of the pin portion 62. The pin portion 62 is cylindrical in shape such that the outer surface 64 is arcuate. In addition, the body 52 includes a barrel portion 68 which is located between the threaded portion 60 and the pin portion 62 such that the threaded and pin portions 60, 62 extend from the barrel portion 68 on opposite sides thereof.

The barrel portion 68 is cylindrical in shape and defines a pair of annular shoulders 70, 72 located at either end of the cylindrical barrel portion 68. The barrel portion 68 also includes an annular groove 74 which is disposed between the pair of annular shoulders 70, 72. A sealing member 76 is received in the annular groove 74 of the barrel portion 68 for providing a seal between the body 52 and the port 48 in the mold structure 24. The sealing member 76 may be an annular neoprene gasket or any other suitable sealing member.

Typically, shoulders 70 of the barrel portion 68 will be disposed flush with the surface of the runner 28 or the cavity surface 34 in the mold 24. On the other hand, the body 52 is threaded into the port 48 until shoulder 72 comes into abutting contact with the stop surface 78 formed at a point in the port 48 where the diameter thereof changes to accommodate the barrel portion 68 which has a larger diameter than either the threaded portion 60 or the pin portion 62 of the body 52.

As shown in the Figures, the pin portion 62 extends into either the runner 28 or the cavity 32 of the mold 24. In one embodiment shown in FIGS. 5 through 7, the outlet 58 includes a plurality of apertures 80 arranged in a predetermined manner relative to one another such that a line connecting at least three of the plurality of apertures 80 approximates the sides of a right triangle. Stated another way, the apertures 80 are arranged relative to one another such that the spacing between at least three apertures can be defined by the relationship $X^2+Y^2=Z^2$, where X is the distance between the first and second apertures, Y is the distance between the second and third aperture and Z forms the hypotenuse of the right triangle and is the distance between the first and third aperture. Furthermore, the apertures 80 are spaced from any adjacent aperture 80 in the outlet 58 in a range between 0.015 and 0.040 inches. The diameters of the apertures 80 may be in the range between 0.0025 and 0.006 inches.

Figure 7:
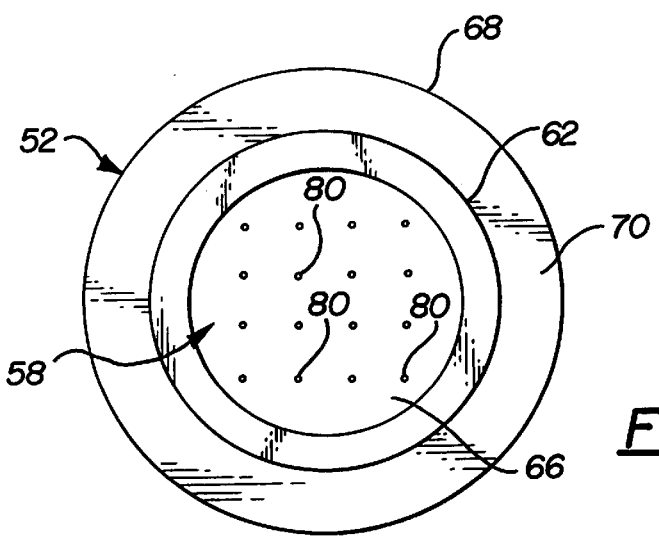
FIG. 7 is an end view of the terminal end of the pin portion of the gas nozzle illustrating one arrangement of the plurality of apertures of the outlet.

As shown in FIGS. 5 and 7, the outlet 58 may be located in the terminal end 66 of the pin portion 62. On the other hand, the outlet 58 may be located on the arcuate outer surface 64 of the pin portion 62. It will be appreciated that when the apertures 80 are located on the arcuate outer surface 64, the arrangement of the apertures 80 will only approximate a right triangle due to the curvature of this surface. It should also be noted that the outlet 58 may also be located on both the terminal end 66 and the outer surface 64 of the pin portion 62.

Another embodiment of the present invention is shown in FIGS. 8 and 9, wherein like numerals are used to indicate like parts. The outlet 58 may include a plurality of apertures 80' arranged in a predetermined radial manner about a common centerpoint on the outlet 58. More specifically, the plurality of apertures 80' are disposed in a prearranged series of concentric circles about a common centerpoint on either the terminal end 66 or on the arcuate outer surface 64 of the pin portion 62. As with the apertures 80, the apertures 80' of the outlet illustrated in FIGS. 8 and 9 are spaced from adjacent apertures 80' in a range between 0.015 and 0.040 inches. Furthermore, the diameter of the apertures 80' is in the range between 0.0025 and 0.006 inches.

Yet another embodiment of the present invention is shown in FIG. 10 wherein like numerals are used to indicate like parts. In this figure, the outlet 58 includes a plurality of apertures 80" arranged in a predetermined manner relative to one another such that a line connecting at least three of the plurality of apertures 80" approximates the size of an equilateral triangle. Stated another way, the apertures 80" are arranged relative to one another such that the spacing between at least three apertures can be defined by the relationship X=Y=Z, where X is the distance between the first and second apertures, Y is the distance between the second and third apertures and Z forms the third side of an equilateral triangle and is equal to the distance between the first and third apertures. As in the other embodiments, the apertures 80" are spaced from any adjacent aperture 80" in the outlet 58 in a range between 0.015 and 0.040 inches. The diameters of the apertures 80" may be in the range between 0.0025 and 0.006 inches.

Figure 11:
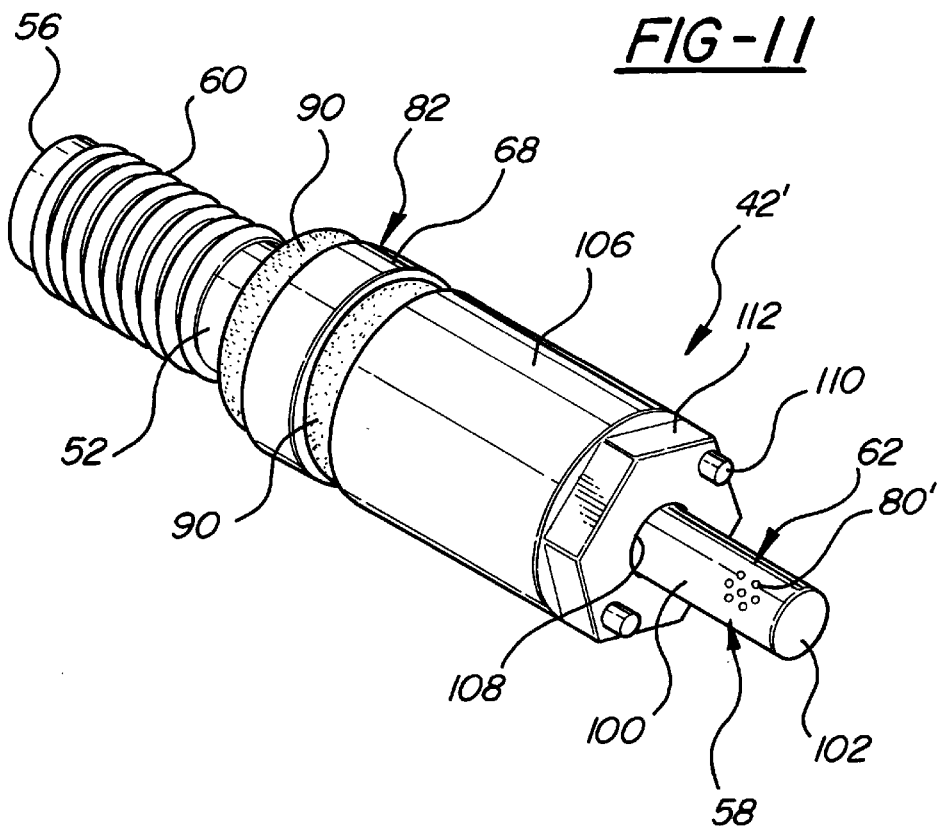
FIG. 11 is a perspective view of one embodiment of the gas nozzle assembly of the present invention.
Figure 12:
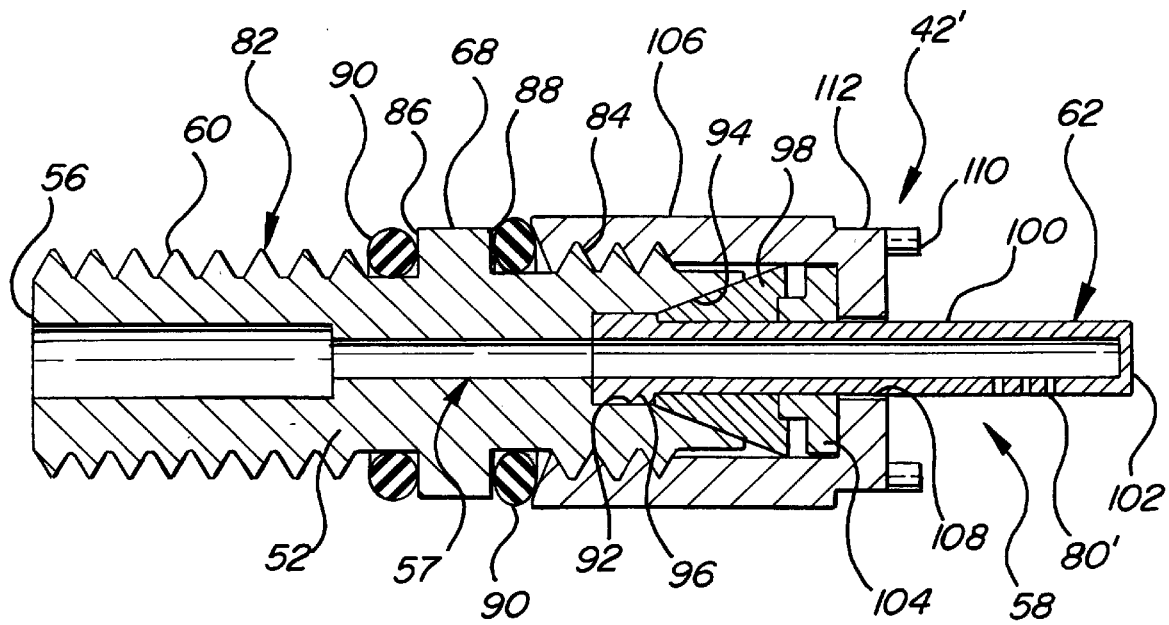
FIG. 12 is a cross-sectional side view of the gas nozzle assembly shown in FIG. 11.

Another embodiment of the present invention is illustrated in FIGS. 11 through 13 which shows a gas nozzle assembly 42'. As with the gas nozzle 42 illustrated in FIGS. 5 through 10 and depending on the preference of the designer, part geometry and other considerations, the gas nozzle assembly 42' may be mounted so as to inject gas into the runner 28 as illustrated in FIG. 1 or into the mold cavity 32 as illustrated in FIGS. 2 and 3. In either case, the mold 24 or runner 28 will include a threaded port 48 which is drilled through the mold or runner and tapped. The threaded port 48 is in fluid communication with a source of pressurized gas 38 through a conduit 50 or any other suitable means.

Referring now to FIGS. 11 through 13, where like numerals are used to designate like structures throughout the figures and where some numeral are primed, the gas nozzle assembly 42' includes a fitting, generally indicated at 82, having an inlet 56 providing fluid communication with the source of pressurized gas 38. The gas nozzle assembly 42' also includes a gas pin portion, generally indicated at 62, having an outlet, generally indicated at 58, through which gas leaves the nozzle assembly 42'. A passage, generally indicated at 57, extends between the inlet 56 and the outlet 58 through the gas pin portion 62 and the fitting 82. The fitting 82 includes a body 52 having a first threaded portion 60 for mounting the fitting in fluid communication with a source of pressurized gas 38 and a second threaded portion 84. A barrel 68 is located between the first threaded portion 60 and the second threaded portion 84 such that the first and second threaded portions 60, 84 extend from the barrel portion 68 on opposite sides thereof.

The barrel portion 68 is cylindrical in shape and defines a pair of annular shoulders 86, 88, located at either end of the cylindrical barrel portion 68. A pair of gaskets 90 abut the annular shoulders 86, 88 of the barrel portion 68 for, among other reasons, providing a seal between the fitting 82 and the port 48 in the mold structure 24. The gaskets 90 may be an annular neoprene gasket or any other suitable sealing member. The barrel portion 68 has a larger diameter than either the first or second threaded portions 60, 84. The body 52 of the fitting 82 is threaded into the port 48 until the gasket 90 is compressed between the barrel 68 and the stop surface 78 formed at a point in the port 48 where the diameter thereof changes to accommodate the barrel portion 68. This is similar to the structure illustrated in FIG. 4.

The second threaded portion 84 on the fitting 82 includes an opening 92 defining seat 94. The gas pin portion 62 includes a head 96 received in the opening 92. The gas pin portion 62 also includes a ferrule 98 which cooperates with the seat 94 and an elongated shaft portion 100 extending therefrom. The shaft portion 100 includes a terminal end 102. An end flange 104 is carried on the shaft portion 100 adjacent the back of the ferrule 98 for a purpose which will be described in greater detail below. In the embodiment disclosed in these figures, the ferrule 98 and end flange 104 are formed separately from the shaft portion 100 but those of ordinary skill in the art will appreciate that all of these components may be formed integrally or separate from one another.

As previously illustrated in FIGS. 1 through 2, the pin portion 62 extends into either the runner 28 or the cavity 32 of the mold 24. The outlet 58 includes a plurality of apertures 80, 80', or 80" arranged in a predetermined manner relative to one another. The outlet 58 may be located on the terminal end 102 of the shaft portion 100. Alternatively, the outlet 58 may be located on the outer arcuate surface of the shaft portion 100. In addition, it is possible that the outlet 58 may be located on the terminal end 102 as well as the outer arcuate surface of the shaft portion 100. As illustrated in FIGS. 11 through 13, the apertures 80' are located on the outer arcuate surface of the shaft portion 100 and arranged in a radial manner about a center point. However, it will be appreciated that the apertures may be arranged so as to form right triangles or equilateral triangles as described and shown above. In the embodiment illustrated in FIGS. 11 through 13, each of the apertures 80, 80', or 80" may be spaced from any adjacent aperture 80, 80', or 80" in the outlet 58 in a range between 0.010 and 0.040 inches.

The gas pin portion 62 of the gas nozzle assembly 42' is adjustably and removably mounted to the fitting 82 such that the orientation of the outlet 58 relative to a mold 24 or runner 28 may be changed. More specifically, the gas nozzle assembly 42' further includes a retainer 106 received on the second threaded portion 84 to adjustably and removably mount the gas pin portion 62 in fluid communication with the fitting 82. The retainer is a cap 106 having an aperture 108 through which the shaft portion 100 of the gas pin portion 62 extends. The cap 106 is threadingly received on the second portion 84 of the fitting 82 such that the position of the gas pin portion 62 relative to the fitting 82 may be adjusted by loosening the cap 106 relative to the second threaded portion 84. To that end, the cap 106 may include tabs 110 which are adapted for use with certain tools or a hex head 112. Both structures, or any other structure suitable for the purpose of loosening or tightening the cap, may be employed. The cap 106 abuts the gasket 90 on one side of the barrel 68 and holds the end flange 104, ferrule 98 and head 96 in compression relative to the opening 92 and the seat 94 in the second threaded portion 84. The gas nozzle assembly 42' of the present invention facilitates the easy adjustment and/or removal of the gas pin portion 62. More specifically, the outlet 58 of the gas pin portion 62 may be adjusted so as to direct the apertures 80, 80', 80" in any way such that the gas flowing from the pin may be directed where desired. Additionally, shorter or longer pin portions 62 may be quickly and easily substituted as desired thus providing another dimension of flexibility for the mold designer.

The apertures 80, 80', 80" are cut into the steel of the pin portion 62 using a laser and are very small as noted above. Yet due, in part, to the number of apertures and the physical arrangement relative to one another, the gas flow through the outlet 58 approximates the flow through a ⅛ inch hole. This provides excellent flow characteristics for the gas nozzle 42 and gas nozzle assembly 42' of the present invention without the problem of having the apertures 80, 80', 80" becoming clogged by molten resin. More specifically, while a skin of molten resin may form over the outlet 58 at the completion of a molding cycle, the individual apertures 80, 80' are sufficiently small such that they do not become clogged. The "skin" covering the plurality of apertures 80, 80', 80" is then easily blown off during the next injection of gas for a subsequent part.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A gas nozzle assembly for a gas assisted injection molding system, said assembly comprising:

a fitting having an inlet providing fluid communication with a source of pressurized gas, a gas pin portion defining a longitudinal axis, said gas pin portion having an outlet through which gas leaves said nozzle assembly and a passage extending between said inlet and said outlet through said gas pin portion and said fitting;

said outlet including a plurality of apertures arranged in a predetermined manner relative to one another;

said gas pin portion being rotatably adjustable about said longitudinal axis and removably mounted to said fitting such that the direction of said outlet relative to a mold may be changed.

2. A gas nozzle assembly as set forth in claim 1 wherein said fitting includes a body having a first threaded portion for mounting said fitting in fluid communication with a source of pressurized gas and a second threaded portion, said assembly further including a retainer received on said second portion to rotatably adjust and removably mount said gas pin portion in fluid communication with said fitting.

3. A gas nozzle assembly as set forth in claim 2 wherein said second threaded portion on said fitting includes an opening defining a seat, said gas pin portion including a head received in said opening, a ferrule cooperating with said seat and an elongated shaft portion extending therefrom, said shaft portion defining an outer surface and a terminal end.

4. A gas nozzle assembly as set forth in claim 3 wherein said retainer includes a cap having an aperture through which said shaft portion of said gas pin portion extends, said cap being threadably received on said second portion of said fitting such that the position of said pin portion relative to said fitting may be rotatably adjusted by loosening said cap relative to said second portion.

5. A gas nozzle assembly as set forth in claim 3 wherein said outlet is located on said terminal end of said shaft portion.

6. A gas nozzle assembly as set forth in claim 3 wherein said outlet is located on said outer surface of said shaft portion.

7. A gas nozzle assembly as set forth in claim 3 wherein said outlet is located on said terminal end and said outer surface of said shaft portion.

8. A gas nozzle assembly as set forth in claim 1 wherein each of said apertures is spaced from any adjacent aperture in said outlet in a range between 0.010 and 0.040 inches.

9. A gas nozzle assembly for a gas assisted injection molding system, said assembly comprising:

a fitting having an inlet providing fluid communication with a source of pressurized gas, a gas pin portion defining a longitudinal axis, said gas pin portion having an outlet through which gas leaves said nozzle assembly and a passage extending between said inlet and said outlet through said gas pin portion and said fitting;

said outlet including a plurality of apertures arranged in a predetermined manner relative to one another wherein each of said apertures is spaced from any adjacent aperture in said outlet in a range between 0.010 and 0.040 inches;

said fitting including a body having a first threaded portion for mounting said fitting in fluid communication with a source of pressurized gas and a second threaded portion, said assembly further including a retainer including an aperture through which said gas pin portion extends, said retainer being threadably received on said second portion such that said gas pin portion may be removably mounted relative to said fitting and such that said outlet may be rotatable adjusted about said longitudinal axis relative to a mold cavity by loosening said retainer relative to said second portion.

10. A gas assisted plastic injection molding apparatus comprising:

a plastic injector having a nozzle and a flow passage from which molten plastic flows into a mold cavity;

a source of pressurized gas and a controller for selectively starting and stopping the injection of molten plastic and pressurized gas into a mold cavity;

a gas nozzle assembly including a fitting having an inlet providing fluid communication with a source of pressurized gas, a gas pin portion defining a longitudinal axis, said gas pin portion having an outlet through which gas leaves said nozzle assembly and a passage extending between said inlet and said outlet through said gas pin portion and said fitting;

said outlet including a plurality of apertures arranged in a predetermined manner relative to one another;

said gas pin portion being rotatably adjustable about said longitudinal axis and removably mounted to said fitting such that the direction of said outlet relative to a mold may be changed.

11. A molding apparatus as set forth in claim 10 wherein said fitting includes a body having a first threaded portion for mounting said fitting in fluid communication with a source of pressurized gas and a second threaded portion, said assembly further including a retainer received on said second portion to rotatably adjust and removably mount said gas pin portion in fluid communication with said fitting.

12. A molding apparatus as set forth in claim 11 wherein said second threaded portion on said fitting includes an opening defining a seat, said pin portion including a head received in said opening, a ferrule cooperating with said seat and an elongated shaft portion extending therefrom, said shaft portion including a terminal end.

13. A molding apparatus as set forth in claim 12 wherein said retainer includes a cap having an aperture through which said shaft portion of said gas pin portion extends, said cap being threadably received on said second portion of said fitting such that the position of said gas pin portion relative to said fitting may be rotatably adjusted by loosening said cap relative to said second portion.

14. A molding apparatus as set forth in claim 12 wherein said outlet is located on said terminal end of said shaft portion.

15. A molding apparatus as set forth in claim 12 wherein said outlet is located on said outer surface of said shaft portion.

16. A molding apparatus as set forth in claim 12 wherein said outlet is located on said terminal end and said outer surface of said shaft portion.

17. A molding apparatus as set forth in claim 10 wherein each of said apertures is spaced from any adjacent aperture in said outlet in a range between 0.010 and 0.040 inches.

\* \* \* \* \*